G. WAGENER.
ELECTRODE FOR PRODUCING ARCS.
APPLICATION FILED NOV. 22, 1911.

1,055,003.

Patented Mar. 4, 1913.

WITNESSES:

INVENTOR
Gustav Wagener
BY
ATTORNEYS

UNITED STATES PATENT OFFICE.

GUSTAV WAGENER, OF SCHLEBUSCH-MANFORT, GERMANY, ASSIGNOR TO E. I. DU PONT DE NEMOURS POWDER COMPANY, OF WILMINGTON, DELAWARE, A CORPORATION OF NEW JERSEY.

ELECTRODE FOR PRODUCING ARCS.

1,055,003.     Specification of Letters Patent.      Patented Mar. 4, 1913.

Application filed November 22, 1911. Serial No. 661,763.

*To all whom it may concern:*

Be it known that I, GUSTAV WAGENER, a subject of the Emperor of Germany, residing at Schlebusch-Manfort, Germany, have invented a new and useful Improvement in Electrodes for Producing Arcs, of which the following is a full, clear, and exact description, reference being had to the accompanying drawings, which form a part of this specification.

My invention relates to certain improvements in electrodes used for producing arcs, and principally for the production of long arc lights for carrying out gas reactions. Its object is to considerably reduce the wear and tear of such electrodes where made of metal. This wear and tear of metal electrodes is due to the heat of such arc lights for which they are the starting point, and occurs even when these metal electrodes are hollow and are internally cooled by some cooling medium, for instance, water.

My invention consists in closely surrounding the metal electrodes with a body which, at ordinary temperatures, is substantially a non-conductor, such for instance, as cement or a similar material, but which, when it becomes heated, will act as a conductor. The arc being initially formed between the metal electrodes, by the heat generated, the surrounding body becomes a conductor at those places, which are close to the arc and the arc will be formed between the surrounding bodies of the electrodes. The metallic electrode is thus relieved and is not subject to the wear and tear to which it otherwise would be subject.

I will now describe the embodiment of my invention, shown in the accompanying drawings, in which—

Figure 1:
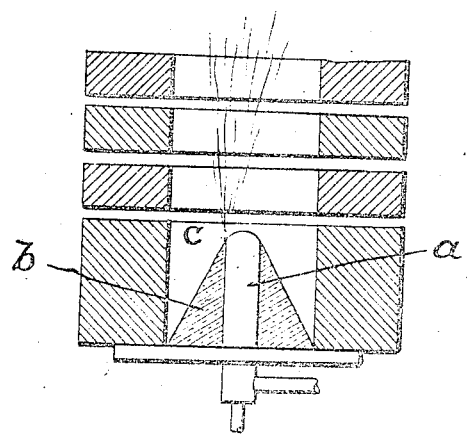
Figure 2:
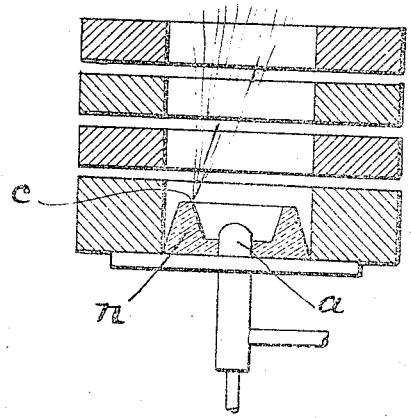

Figure 1 is a sectional view of an electrode embodying my invention. Fig. 2 is a similar view of another embodiment of my invention.

In Fig. 1 $a$ is a water cooled metallic electrode closely surrounded by a conical body $b$ made of cement, clay or similar material. Due to the fact that this surrounding body $b$, when cold, is a non-conductor, the arc is initially formed by the metallic portion $a$. As soon, however, as the arc has caused the surrounding body to glow, at the point $c$ near where the arc springs from the metallic electrode, this surrounding body $b$ becomes a conductor, and the arc jumps from the metal electrode to a point of the surrounding body near the point of the formation of the arc. The fresh air entering from the side, endeavors to press the arc from the surrounding body to the metallic electrode, but as the metal electrode is cooled, the affinity for the surrounding body is greater and the starting point of the arc is mostly formed in the surrounding body on which, during the time of the existence of the arc, this starting point assumes different positions. The metal electrode, itself, is affected but little by the arc, and its wear and tear reduced to a minimum. The surrounding body is of such material as to be well able to withstand the action of the arc, and furthermore, due to the frequent changing of the starting point of the arc, the full effect of the arc is distributed over a considerable area.

In Fig. 2 the body $n$ surrounding the metallic electrode $a$ is of different specific construction from that of the surrounding body $b$ of Fig. 1. In the construction of Fig. 2, I use a hollow body, but of the same material as that of the surrounding body $b$, Fig. 1. Into this hollow body the cooled electrode is placed. The ends of the body project beyond the end of the metallic electrode. In this construction, as in that of Fig. 1, as soon as the arc is formed by the metallic electrode, the walls of the surrounding body are highly heated and the arc is formed from the projecting ends of said body. It assumes different positions along the upper border of said surrounding body.

I do not herein claim specifically the electrode disclosed in Fig. 2, as the same forms the subject matter of a divisional application filed by me May 1, 1912, Serial No. 694,436.

Having now fully described my invention, what I claim and desire to protect by Letters Patent is:

1. An improved electrode for forming and maintaining arcs comprising a metallic core by which the arc is initially formed and an electrode of cement surrounding and not chemically combinable with the metallic core and permanently associated therewith during the maintenance of the arc, and by which, after the surrounding electrode is rendered conductive by heat, the arc is maintained.

2. The combination with an electrode comprising a core of metal and a sheath of a non-volatile refractory earth not chemically combinable with the metal of the core, of a gas-reaction chamber surrounding the electrode and having air-admission ports adapted to admit air into the arc space, whereby after the arc is initially formed, it is maintained substantially wholly by the surrounding sheath.

3. An improved electrode for producing arcs for carrying out gas reactions, comprising an artificially-cooled metallic electrode and a surrounding body of material normally non-conductive but adapted to be rendered conductive by heat, said surrounding body adapted, after its elevation in temperature following the initial formation of the arc by the metallic electrode, to have a greater affinity for the arc than the cooled metallic electrode and therefore to act to maintain the arc and cause the latter to assume different positions thereon, thereby reducing the wear of the electrode to a minimum.

In testimony of which invention, I have hereunto set my hand, at Cologne, Germany, on this 3d day of November, 1911.

GUSTAV WAGENER.

Witnesses:
 ERNST SCHWARZ,
 HANS DUNCKER.